Patented Jan. 29, 1952

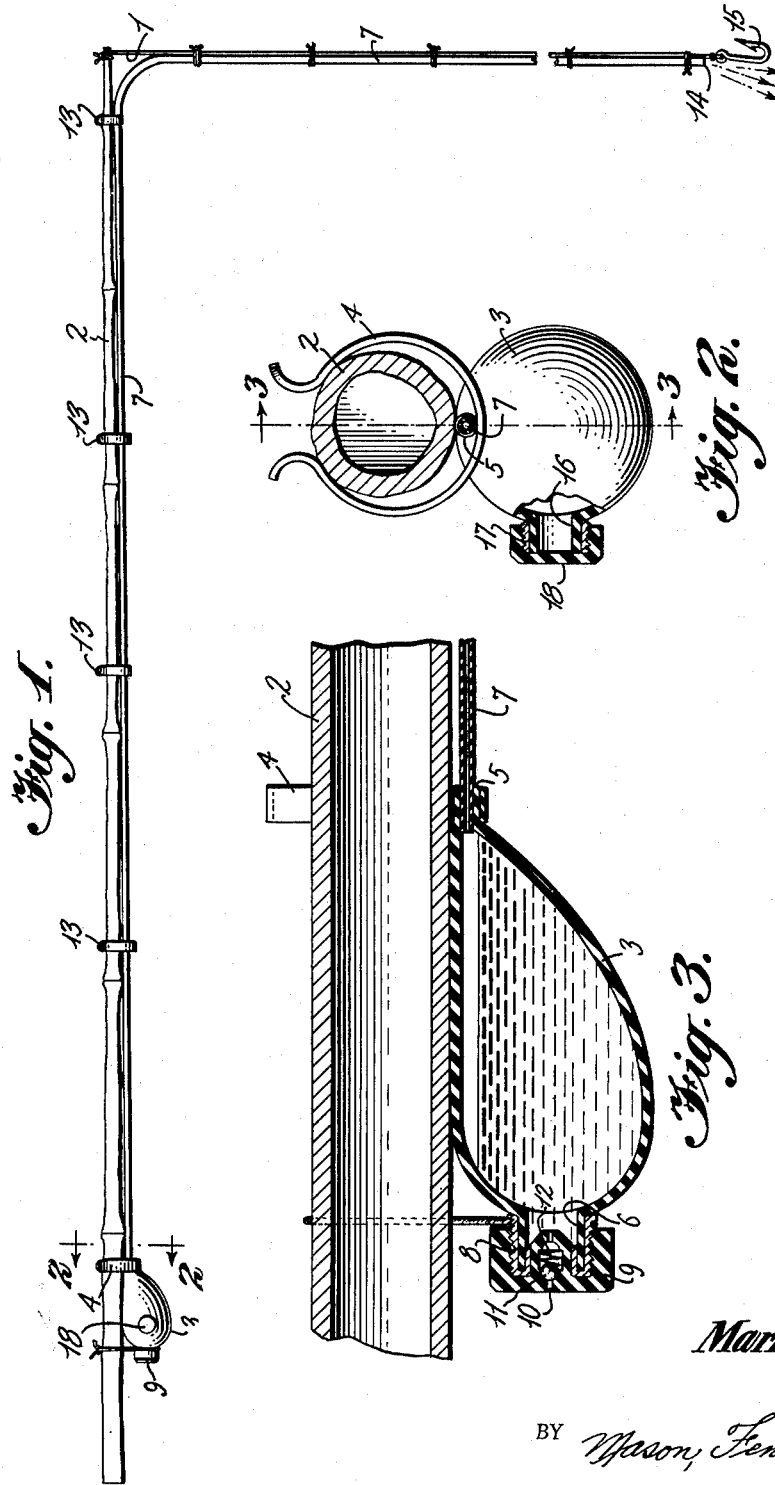

2,583,660

UNITED STATES PATENT OFFICE 2,583,660

LIQUID LURE EJECTING DEVICE USEFUL IN FISHING

Mark Moore, Davenport, Nebr.

Application November 30, 1950, Serial No. 198,275

4 Claims. (Cl. 43—44.99)

1

This invention relates to sport fishing, and is particularly directed to a device for intermittently supplying liquid lure to the water in the region of the fishhook, which diffuses or travels in the direction of movement of the tide or current, forming a trail progressively spreading as it recedes from the hook, attracting fish which may swim within its area, inducing them to swim up the trail toward the focal point where is the baited hook.

One of the objects of the invention is to provide a compressible bulb or similar displacement device adapted to be filled with suitable liquid lure, which may be blood, fish oil, etc., said bulb to be located convenient to the hand of the fisherman and communicating with a small gauge flexible tube which parallels the fishline and has its discharge end adjacent the fishhook.

Other objects of the invention will appear as the following description of an illustrative embodiment thereof proceeds.

In the drawing which accompanies and forms a part of the following specification:

Figure 1 is a side elevation illustrating a fish rod and line equipped with the device of my invention;

Figure 2 is a cross-section taken on the line 2—2 of Figure 1;

Figure 3 is a vertical longitudinal sectional view taken on the line 3—3 of Figure 2.

Referring now in detail to the drawing, this shows an extremely simple embodiment of the invention in which no reel is used, and the fishing is done at fixed depth, the fishline 1 being secured to the end of the rod 2. The simple device shown is equally adapted to be used with a hand line. The flexible bulb 3 is detachably secured to the rod 2 by a spring clip 4. The opposite end of the bulb is shown somewhat yieldably secured to the rod by a cord, so as not to restrict the operation of the bulb. The bulb is molded with projecting nipples 5 and 6 at its opposite ends, the nipple 5 receiving the adjacent end of the small gauge flexible tube 7. The opposite nipple 6 carries a threaded ferrule 8 to which a valve cage 9 is secured, having an air inlet passage 10 with an enlarged bore at an intermediate point forming a valve chamber for the ball check valve 11. The valve 11 closes outwardly and is normally maintained closed by a very light spring 12.

The tube 7 may be detachably secured at intervals to the rod by means such as the clips 13, substantial duplicates of the clip 4, and it

2 is tied at intervals to the fishline. The tube 7 may be as small as one-eighth inch outside diameter, with a bore one-sixteenth inch in diameter. This small size makes the tube extremely flexible so that it does not interfere with freedom of movement of the fishline. The mouth 14 of the tube 7 opens adjacent the hook 15.

The bulb is provided with an integrally molded filler neck 16, having a threaded ferrule 17 upon which a closure cap 18 is received. The bulb may be filled with a funnel.

Probably the best liquid lure is chicken blood, which should be somewhat diluted with water in order to permit it to flow freely through the one-sixteenth inch bore in the tube. A little oxalic acid should be added to keep the blood from congealing. Fish oil is another good liquid lure, and there are others. The bulb is designed to hold about a quart of the liquid.

In fishing, the hook is baited and lowered to the desired depth. The bulb is then squeezed and a jet of the liquid lure issues adjacent the hook, spreading in a trail directed by whatever tidal flow or current may be at that point. Fish discovering the taint, swim up the trail in the direction of its increasing concentration until they reach the hook.

While waiting for fish, the fisherman periodically squeezes the bulb, intermittently renewing the trail of liquid lure.

The bulb could be operated without a valved air inlet, but not with optimum efficiency, due to the fact that in recovering its shape the bulb would draw the liquid lure back from the tube, its place in the tube being taken by plain water, which would be the first liquid expelled in the next impulse. Under such circumstances if considerable lure were expelled at each impulse, water would be drawn up into the bulb upon each recovery, unduly diluting the lure. By having the check valve controlled air inlet, the bulb in recovery will draw air past the check valve, preferentially to drawing liquid through the tube, in view of the magnitude of the skin friction in the tube due to the small cross-section of its bore.

While I have in the above description disclosed a simple arrangement and construction illustrating the inventive concept, it will be obvious to those skilled in the art, as well as others, that the embodiment shown is solely by way of illustration and not to be construed as restricting the scope of the invention.

What I claim is:

1. In combination with a fishline having a fishhook at one end thereof, a small gauge flexible tube contiguous to said fishline and secured thereto throughout a substantial portion of the length thereof having its discharge end adjacent the fishhook, and a collapsible bulb adapted to contain liquid fish lure positioned remote from said fishhook and connected to the opposite end of said tube.

2. In combination with a fishline having a fishhook at one end thereof, means adapted to be operated to periodically eject liquid fish lure in the water adjacent the fishhook, said means comprising a collapsible bulb adapted to contain liquid fish lure, said bulb being positioned convenient to the hand holding the fishing apparatus, and a small gauge tube communicating with said bulb and extending along and secure to said fishline and having its discharge end adjacent said fishhook.

3. In combination with a fishing rod having a fishline with a fishhook at one end thereof, means adapted to be operated to periodically eject liquid fish lure in the water adjacent the fishhook, said means comprising a collapsible bulb adapted to contain liquid fish lure, means detachably securing said bulb to said fish rod, a small gauge flexible tube connected to said bulb detachably secured to said fish rod and extending along said fishline contiguous thereto up to a point adjacent said fishhook, said tube having a discharge opening adjacent said fishhook.

4. In combination with a fishing rod having a fishline with a fishhook at one end thereof, means adapted to be operated to periodically eject liquid fish lure in the water adjacent the fishhook, said means comprising a collapsible bulb having a filling aperture with closure cap, said bulb being adapted to contain liquid fish lure, means for detachably securing said bulb to a fish rod, a small gauge flexible tube connected to said bulb, means for supporting said tube from said fish rod, said tube extending along said fishline having its discharge end adjacent said fishhook, means at intervals in the length of said tube and fishline for securing said tube to said fishline, said bulb having a check valve controlled air inlet opening in a direction to admit atmosphere.

MARK MOORE.

REFERENCES CITED

The following references are of record in the file of this patent:

UNITED STATES PATENTS

| Number | Name | Date |
|---|---|---|
| 536,512 | Crossley et al. | Mar. 26, 1895 |
| 1,190,872 | Dildine | July 11, 1916 |
| 1,448,120 | Johnson | Mar. 13, 1923 |
| 2,465,127 | Stark | Mar. 22, 1949 |
| 2,532,879 | Baker | Dec. 5, 1950 |
| 2,542,412 | Houser | Feb. 20, 1951 |
| 2,560,670 | Volenec et al. | July 17, 1951 |